United States Patent [19]
Wang

[11] Patent Number: 5,461,756
[45] Date of Patent: Oct. 31, 1995

[54] RETRACTABLE LUGGAGE HANDLE RELEASE CONTROL AND INNER TUBE POSITIONING ARRANGEMENT

[76] Inventor: King-Sheng Wang, No. 569, Ching Kuo Rd., Ta Chia Chin, Taichung Hsien, Taiwan

[21] Appl. No.: 294,505

[22] Filed: Aug. 23, 1994

[51] Int. Cl.[6] ........................................................ B25G 1/04
[52] U.S. Cl. ............................................... 16/115; 280/655
[58] Field of Search ................................. 16/115, 111 R, 16/DIG. 38; 280/47.315, 47.31, 651, 655, 656.1; 190/14, 15 R, 104, 18 R, 18 A

[56] References Cited

U.S. PATENT DOCUMENTS 5,178,404   1/1993   Chen ............................................ 16/115

Primary Examiner—P. Austin Bradley
Assistant Examiner—Chuck Y. Mah
Attorney, Agent, or Firm—Bacon & Thomas

[57] ABSTRACT

The arrangement includes a release control mechanism and an inner tube positioning structure, wherein the release control mechanism consists of a hollow control block fixed between the sleeves of the retractable luggage handle, a sliding block slidably mounted on two downward rods inside the control block, two curved springs respectively fastened to the downward rods and stopped against the sliding block at the bottom, and a press bar fastened to the sliding block and disposed outside the control block and pressed to force down the sliding block causing the two opposite sloping ends of the sliding block to push back the spring bolts on the inner tubes permitting the inner tubes to be collapsed; the inner tube positioning structure of female locating elements and male locating elements respectively fastened to the sleeves and the inner tubes for allowing the inner tubes, the female and male locating elements being respectively connected together when the inner tubes are received inside the sleeves.

3 Claims, 7 Drawing Sheets

5,461,756

RETRACTABLE LUGGAGE HANDLE RELEASE CONTROL AND INNER TUBE POSITIONING ARRANGEMENT

BACKGROUND OF THE INVENTION

The present invention relates to a retractable luggage handle release control mechanism for releasing the inner tubes of a retractable luggage handle from the constraint permitting them to be moved from the operative position to the collapsed position. The present invention also relates to an inner tube positioning structure which holds the inner tubes in the collapsed position when then are received in the sleeves of the retractable luggage handle.

FIG. 1 shows a retractable luggage handle release control mechanism for releasing the inner tubes of a retractable luggage handle from the constraint permitting them to be moved from the operative position to the collapsed position. The mechanism comprises a control block having two vertical barrels at two opposite ends for mounting around the sleeves of a retractable luggage handle, a sliding block disposed inside the control block, a press bar disposed outside the control block and having two downward rods connected to the sliding block, a bottom cover covered on the control block, and two compression springs respectively mounted around two upright rods on the bottom cover and stopped against the sliding block at the bottom. The sliding block has two arched notches on two opposite ends thereof respectively fitting around the sleeves of the retractable handle. When the press bar is depressed, the sliding block is moved downwards, causing the spring bolts of the inner tubes forced back inside the sleeves by the two opposite notched ends of the sliding block. Because the notched ends of the sliding block are constantly disposed in contact with the sleeves, the outside wall of the sleeves and the notched ends of the sliding block will quickly wear out with use, causing the movement of the sliding block unstable.

SUMMARY OF THE INVENTION

The present invention eliminates the aforesaid problem. According to the present invention, the control block has two downward rods for guiding the movement of the sliding block. The sliding block has two opposite ends sloping downwards inwards. Therefore, the contact area between either the sliding block and the sleeves of the retractable luggage handle is minimized. The present invention also provides an inner tube positioning structure for holding the inner tubes of the retractable luggage handle in the collapsed position. The inner tube positioning structure includes a pair of male locating elements and a pair of female locating elements respectively fastened to the inner tubes and the sleeves. When the inner tubes are received inside the sleeves, the male and female locating elements are connected together to hold the inner tubes in the collapsed position.

DETAILED DESCRIPTION OF THE PREFERRED EMBODIMENT

Figure 1:
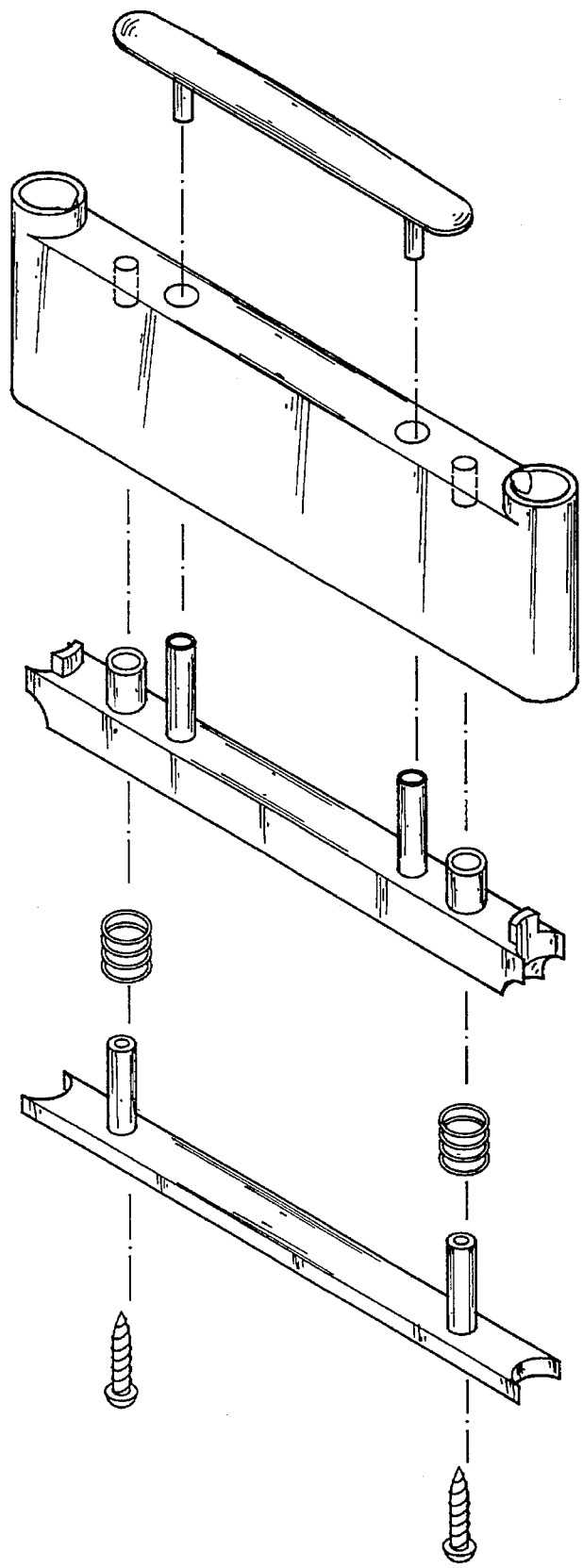
FIG. 1 is an exploded view of a release control mechanism for a retractable luggage handle according to the prior art.
Figure 2:
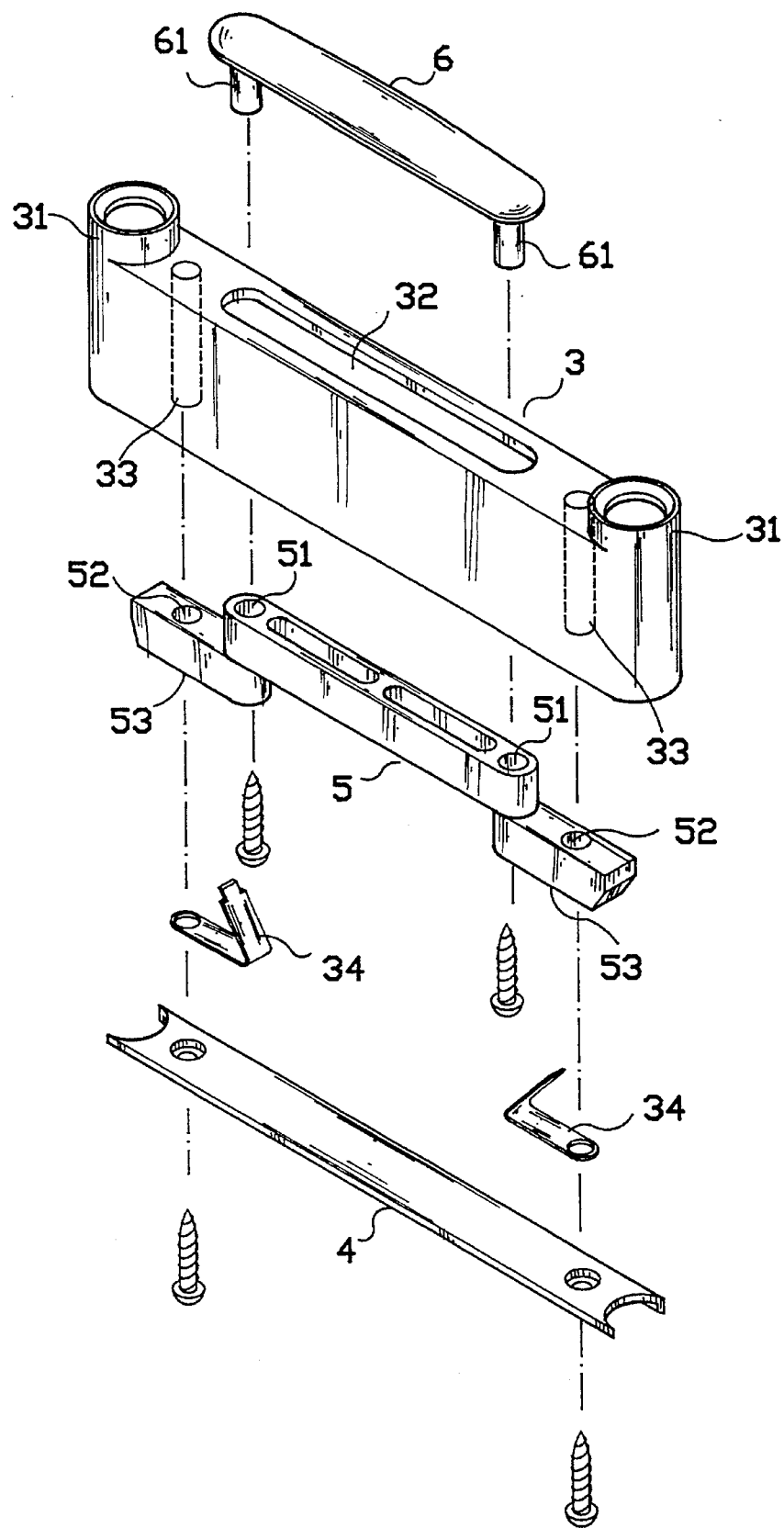
FIG. 2 is an exploded view of a release control mechanism for a retractable luggage handle according to the present invention.
Figure 3:
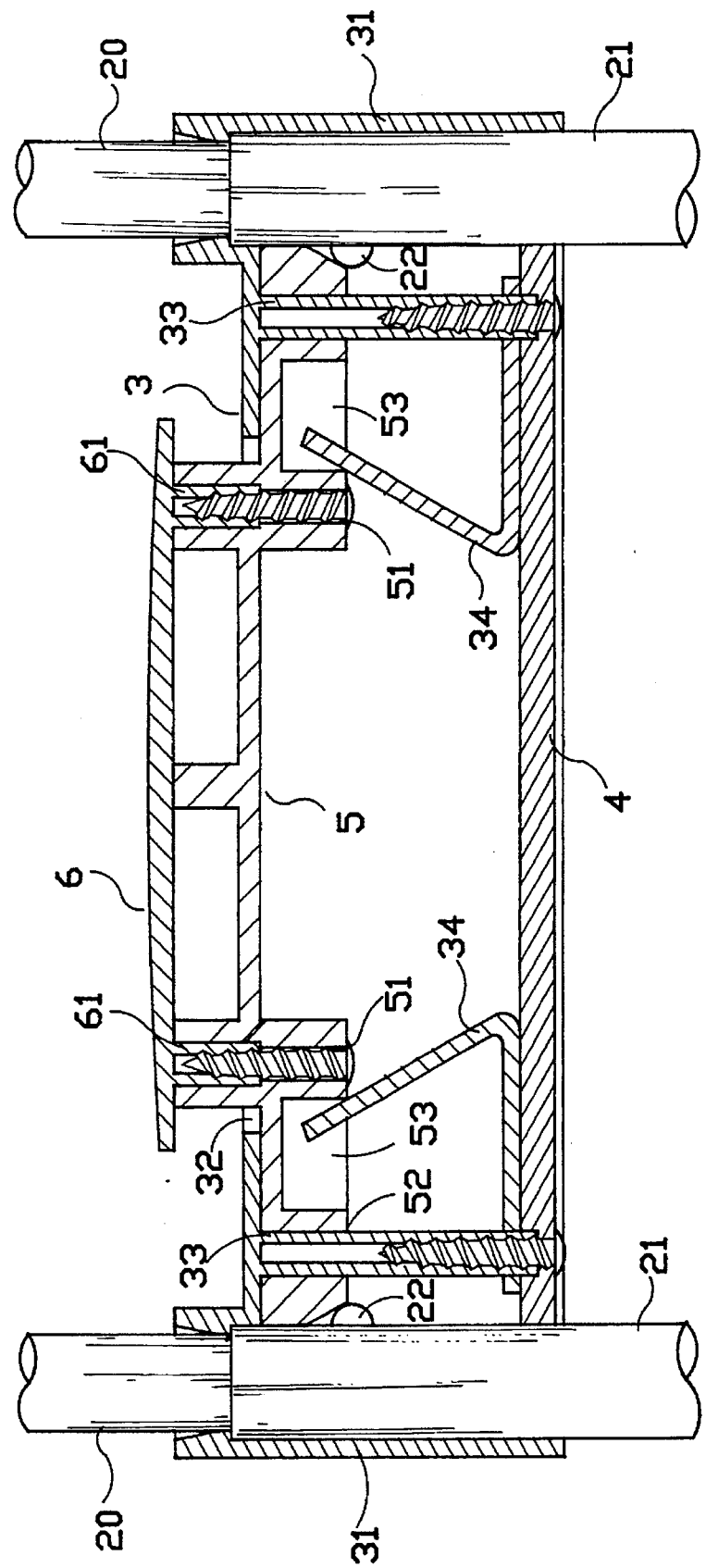
FIG. 3 is an assembly view in section of the release control mechanism shown in FIG. 2.
Figure 7:
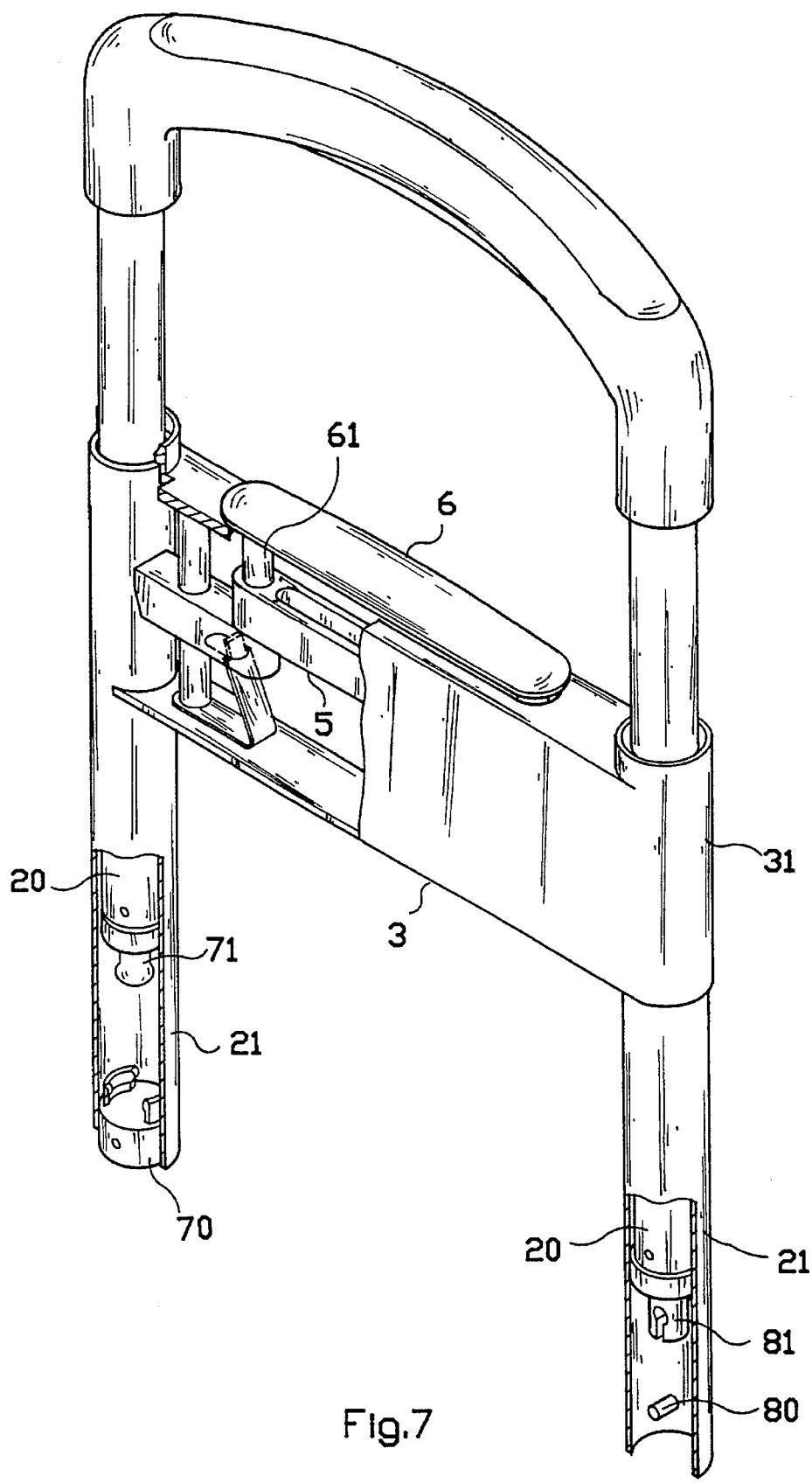
FIG. 7 is a cutaway of a retractable luggage handle according to the present invention.

Referring to FIGS. 2, 3, and 7, a retractable luggage handle is generally comprised of two parallel sleeves 21, two inner tubes 20 moved in the sleeves 21 and joined together by a hand grip outside the sleeves 21, and a release control mechanism mounted between the sleeves 21 at the top and controlled to release the inner tubes 20 from the constraint permitting them to be pulled out of the sleeves 21 into the operative position. The release control mechanism comprises a hollow control block 3, a bottom cover 4, a sliding block 5, and a press bar 6. The sliding block 5 comprises a first pair of vertical axle holes 51 and a second pair of vertical axle holes 52 respectively disposed at different elevations, and two opposite bottom chamber 53. The control block 3 comprises two vertical barrels 31 at two opposite ends respectively mounted around the sleeves 21 at the top, an elongated horizontal opening 32 at the top, two downward rods 33 spaced between the vertical barrels 31 and the horizontal opening 32 and respectively inserted through the second pair of vertical axle holes 52 on the sliding block 5. The bottom cover 4 is fastened to the downward rods 33 and covered on the control block 3 at the bottom. The press bar 6 comprises two downward rods 61 inserted into the horizontal opening 32 on the control block 3 and respectively fastened to the first pair of axle holes 51 on the sliding block 5. There are provided two curved spring plates 34 retained between the bottom cover 4 and the sliding block 5. Each curved spring plate 34 has one end supported on the bottom cover 4 and connected to one downward rod 33 of the control block 3 and an opposite end suspended in one bottom chamber 53 of the control block 3.

Figure 4:
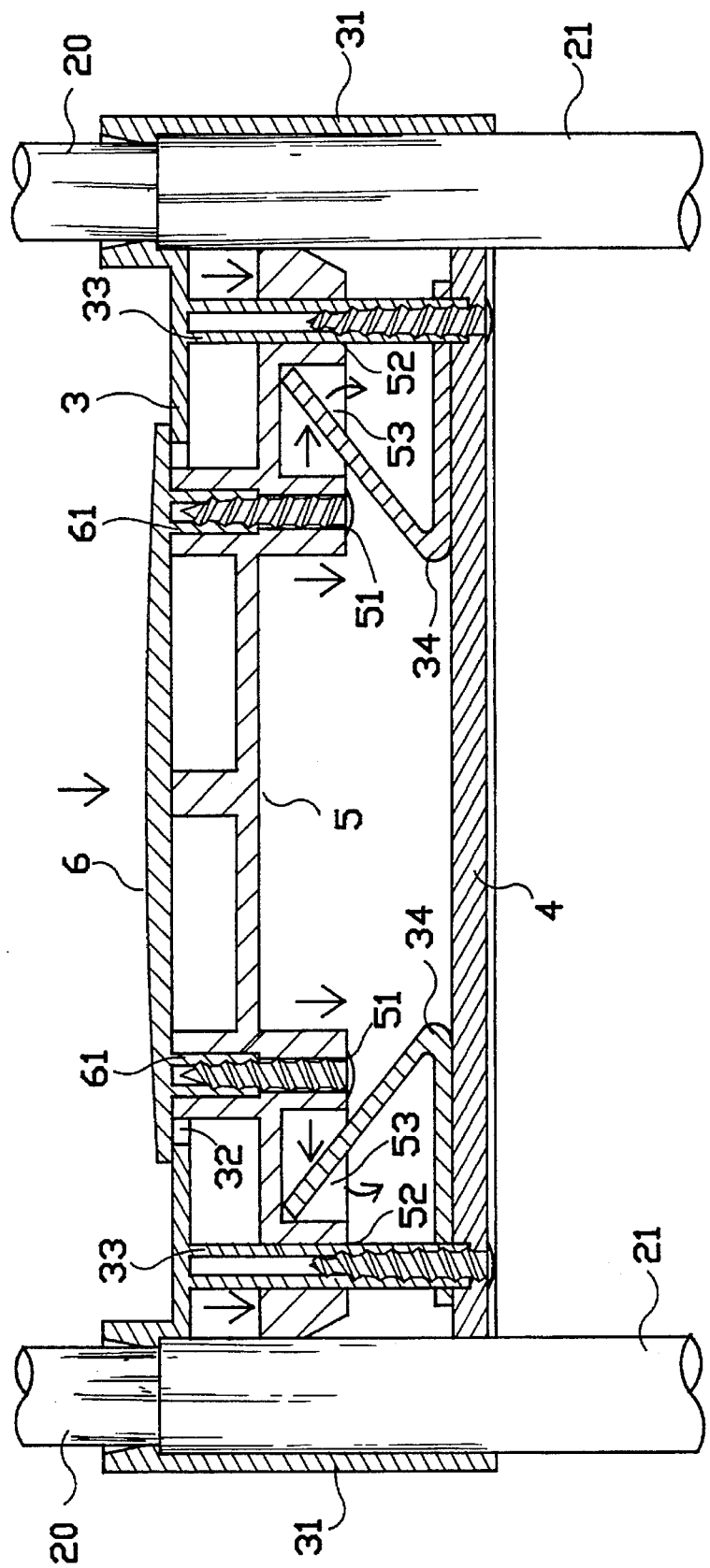
FIG. 4 is similar to FIG. 3 but showing the presser bar depressed and the inner tubes released from the constraint.

Referring to FIG. 4, when the press bar 6 is pressed down, the sliding block 5 is moved downwards to compress the curved spring plates 34 and to force the spring bolts 22 of the inner tubes 20 back inside the sleeves 21, and therefore the inner tubes 20 are released from the constraint and can be moved from the operative position into the collapsed position received inside the sleeves 21. When the press bar 6 is released from the pressure, the curved springs 34 automatically push the press bar 6 back to its former position.

Referring to FIG. 2 again, the two opposite ends of the sliding block 5 slope downwards inwards so that the spring bolts 22 of the inner tubes 20 can be smoothly moved back inside the sleeves 21 by the two opposite ends of the sliding block 5 when the sliding block 5 is pressed downwards. The arrangement of the sloping ends of the sliding block 5 greatly reduces the friction between the sliding block 5 and the sleeves 21.

Figure 5:
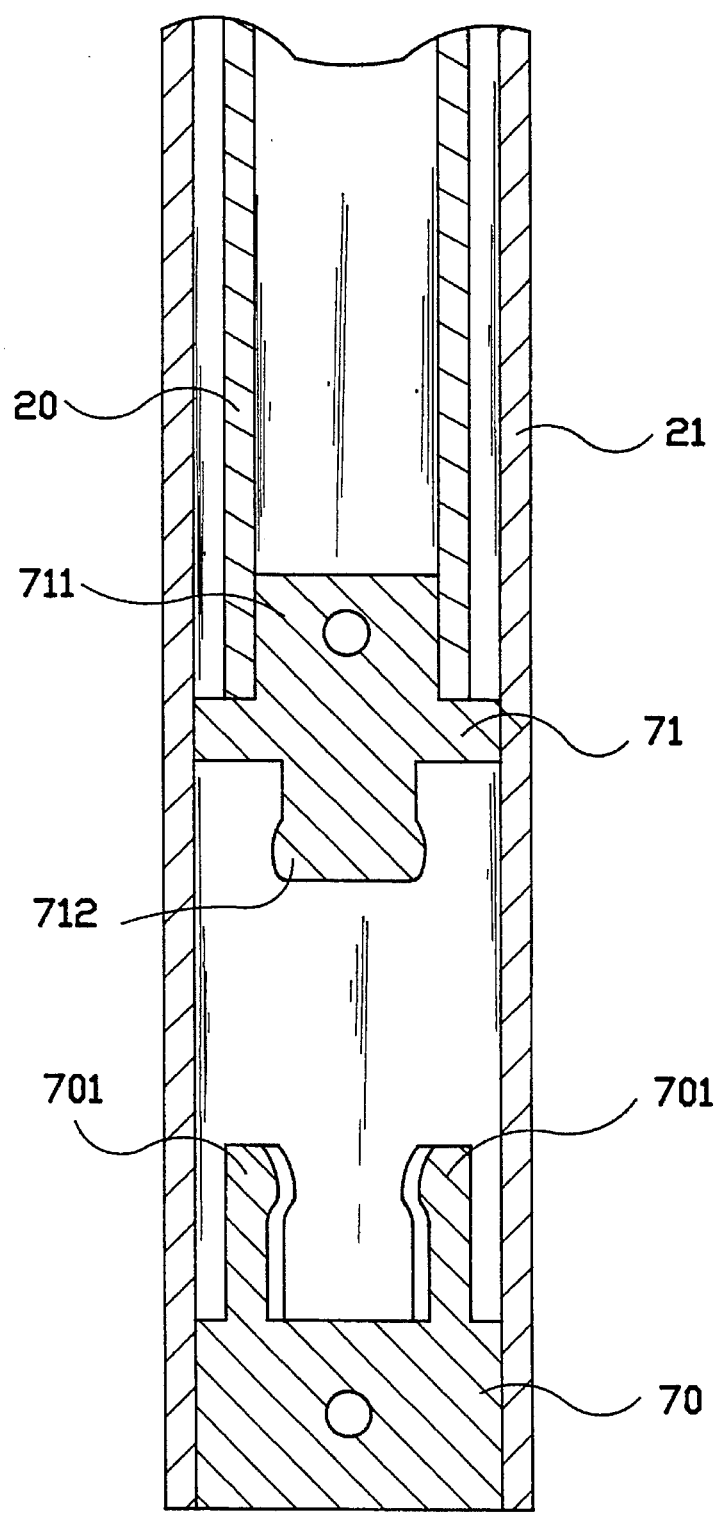
FIG. 5 is a longitudinal view in section, showing an inner tube positioning device according to the present invention.

Referring to FIG. 5, a first locating element 70 is mounted inside the sleeve 21 at the bottom, having an upright receptacle portion 701 at the top; a second locating element 71 is mounted on each inner tube 20 at the bottom, having a mounting portion 711 at one end fitted into the bottom end of the inner tube 20 and a plug portion 712 at an opposite end for fastening to the upright receptacle portion 701 by plugging. When the inner tube 20 is received inside the sleeve 21, the plug portion 712 is forced into the receptacle portion 701, and therefore the inner tube 20 is firmly retained in the collapsed position.

Figure 6:
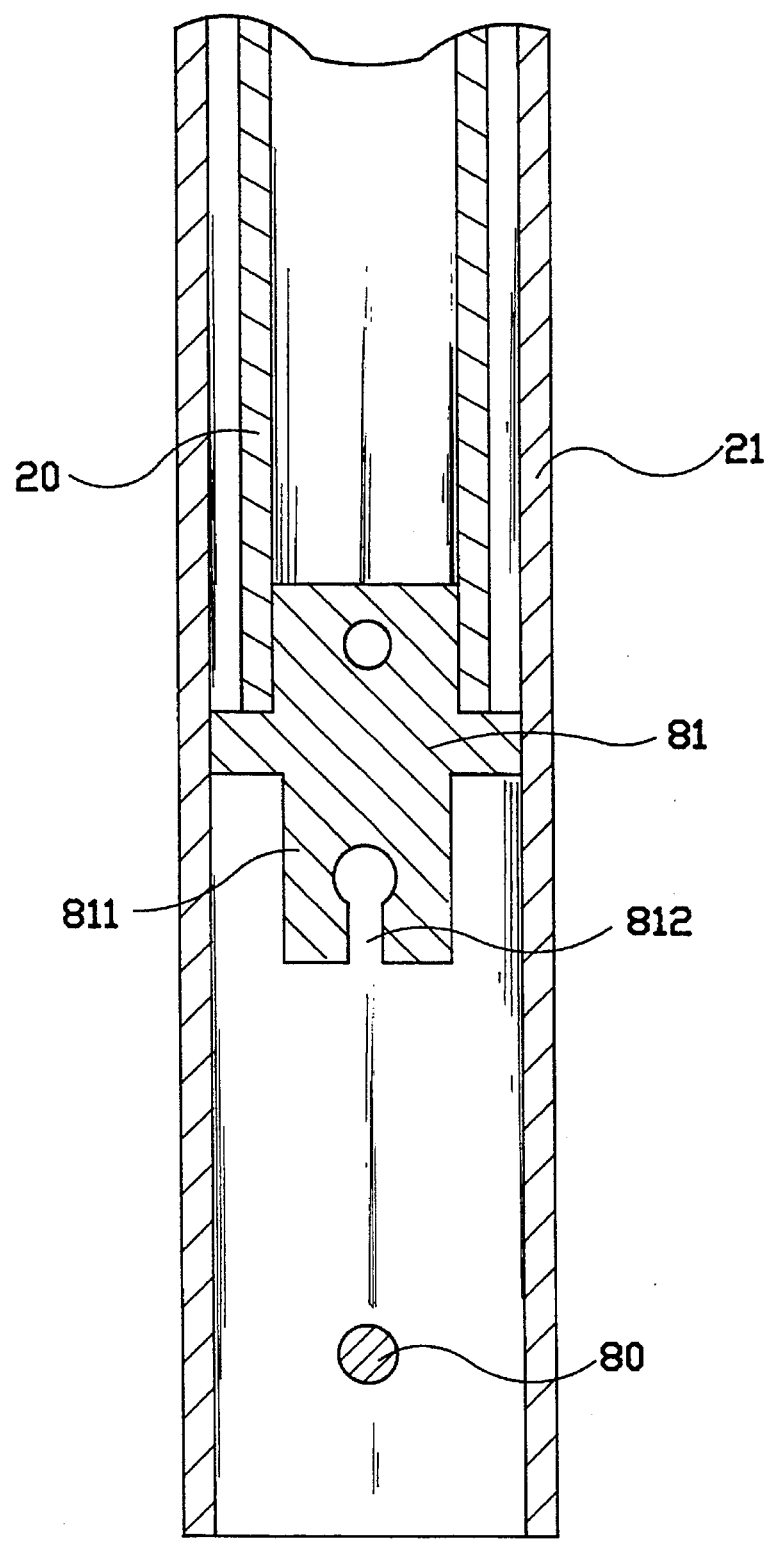
FIG. 6 is a longitudinal view in section, showing an alternative form of the inner tube positioning device of the present invention.

FIG. 6 shows an alternative form of the positioning mechanism for holding the inner tube in the collapsed position. As illustrated, the sleeve 21 comprises a locating pin 80 transversely disposed on the inside near the bottom; the inner sleeve 20 is mounted with a bottom end block 81 having a key hole 812 on the bottom of a bottom projection 811 thereof. When the inner tube 20 is received inside the sleeve 21, the locating pin 80 is forced into the key hole 812, causing the inner tube 20 retained in the collapsed position.

I claim:

1. A retractable luggage handle release control and inner tube positioning arrangement for a retractable luggage handle of the type having two sleeves and two inner tubes moved in the sleeves and joined by a hand grip outside the sleeves, said inner tubes having a respective spring bolt for inserting into a respective locating hole on each sleeve for permitting said inner tubes to be retained in an operative position extended out of said sleeves, the arrangement comprising a release control mechanism mounted between said sleeves and controlled to force the spring bolts of said inner tubes back inside said sleeves for permitting said inner tubes to be moved from said operative position to a collapsed position received inside said sleeves, and inner tube positioning structure for holding said inner tubes in said collapsed position, wherein:

said release control mechanism comprises:

a sliding block movably received inside a hollow control block, said sliding block having an inner pair of vertical axle holes and an outer pair of vertical axle holes respectively disposed at different elevations, two opposite bottom chambers, and two bevel ends converging inwardly toward each other;

said hollow control block fixedly mounted between said sleeves near top ends of said sleeves and covered with a bottom cover, said hollow control block having an elongated top opening and two downward rods respectively inserted through said outer pair of axle holes and perpendicularly fastened to said bottom cover;

a press bar having two downward rods inserted into the top opening on said control block and fixedly fastened to said inner pair of axle holes; and two curved spring plates bilaterally stopped between said bottom cover and said sliding block, each curved spring plate having a horizontal bottom section supported on said bottom cover and fastened to one downward rod of said control block and a sloping top section inserted into one bottom chamber on said sliding bloc;

said inner tube positioning structure comprises:

two first locating elements respectively fastened to said inner tubes at a bottom end;

two second locating elements respectively fixedly mounted inside said sleeves for receiving said first locating blocks to hold said inner tubes in said collapsed position.

2. The inner tube positioning structure of claim 1 wherein said first locating elements have each a downward plug portion; said second locating elements have each an upward receptacle portion for receiving the downward plug portion of the respective first locating element.

3. The inner tube positioning structure of claim 1 wherein said second locating elements are respectively made of cylindrical shape transversely disposed inside said inner tubes; said first locating elements have each a keyhole for receiving said second locating elements when said inner tubes are collapsed.

* * * * *